United States Patent
Popp et al.

(10) Patent No.: US 7,811,199 B2
(45) Date of Patent: Oct. 12, 2010

(54) METHOD FOR THE OPERATION OF A DRIVETRAIN

(75) Inventors: Christian Popp, Kressbronn (DE); Klaus Steinhauser, Kressbronn (DE); Gerald Klein, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 487 days.

(21) Appl. No.: 11/811,431

(22) Filed: Jun. 7, 2007

(65) Prior Publication Data
US 2007/0287583 A1 Dec. 13, 2007

(30) Foreign Application Priority Data
Jun. 8, 2006 (DE) .................. 10 2006 026 599

(51) Int. Cl.
*F16H 61/40* (2010.01)
*F16H 31/00* (2006.01)

(52) U.S. Cl. .............. 477/68; 477/69; 477/70; 477/71

(58) Field of Classification Search ............ 477/70, 477/143, 155, 68, 69; 475/116, 118, 121
See application file for complete search history.

(56) References Cited

U.S. PATENT DOCUMENTS

| | | | |
|---|---|---|---|
| 5,113,343 A | 5/1992 | Hunter et al. | |
| 6,508,742 B2 | 1/2003 | Popp et al. | |
| 6,577,939 B1 | 6/2003 | Keyse et al. | |
| 6,623,397 B1 | 9/2003 | Raghavan et al. | |
| 6,626,786 B2 * | 9/2003 | Hayabuchi et al. | 475/127 |
| 6,832,976 B2 | 12/2004 | Nishida et al. | |
| 7,048,673 B2 * | 5/2006 | Shim et al. | 477/143 |
| 7,374,512 B2 * | 5/2008 | Ayabe et al. | 477/133 |
| 7,559,875 B2 * | 7/2009 | Steinhauser et al. | 477/117 |
| 2003/0220170 A1 | 11/2003 | Nishida et al. | |
| 2005/0282680 A1 | 12/2005 | Soh | |
| 2006/0046892 A1 | 3/2006 | Bucknor et al. | |
| 2007/0129211 A1 | 6/2007 | Steinhauser et al. | |

FOREIGN PATENT DOCUMENTS

| | | |
|---|---|---|
| DE | 199 18 734 A1 | 11/2000 |
| DE | 199 28 674 A1 | 12/2000 |
| DE | 199 63 752 A1 | 7/2001 |
| DE | 100 35 479 A1 | 2/2002 |
| DE | 103 21 961 A1 | 2/2004 |
| DE | 103 38 624 A1 | 11/2004 |

(Continued)

*Primary Examiner*—Tisha D Lewis
(74) *Attorney, Agent, or Firm*—Davis & Bujold, P.L.L.C.

(57) ABSTRACT

A method for operating a multi-speed automatic transmission of a motor vehicle. The automatic transmission has multiple shift elements for transmitting torque and/or power. When in forward and reverse gears, a first number of shift elements are engaged, and a second number of shift elements are disengaged. To improve the shift speed of successive upshifts and/or successive downshifts which are implemented in an overlapped manner, during a first upshift and/or downshift, at least one shift element, necessary for a successive second upshift and/or downshift, is prepared during the first upshift and/or downshift such that when the first upshift and/or downshift reaches a synchronous point, immediate implementation of the successive second upshift and/or downshift is possible. Depending on a gear change to be implemented, the first upshift and/or downshift from a current gear to a desired gear is preferably implemented as a multiple shift rather than a single shift.

10 Claims, 2 Drawing Sheets

FOREIGN PATENT DOCUMENTS

| | | |
|---|---|---|
| DE | 103 30 153 A1 | 2/2005 |
| DE | 103 61 288 A1 | 7/2005 |
| DE | 10 2004 001 380 A1 | 8/2005 |
| DE | 10 2004 010 269 A1 | 9/2005 |
| DE | 10 2005 008 383 A1 | 9/2005 |
| DE | 10 2004 040 611 A1 | 3/2006 |
| DE | 10 2004 041 507 A1 | 3/2006 |
| DE | 10 2004 043 345 A1 | 3/2006 |
| EP | 1 219 686 A2 | 7/2002 |
| EP | 1 398 536 A2 | 3/2004 |
| EP | 1 533 543 A2 | 5/2005 |
| WO | WO-2004/097266 A1 | 11/2004 |
| WO | WO-2005/065981 A1 | 7/2005 |

* cited by examiner

METHOD FOR THE OPERATION OF A DRIVETRAIN

This application claims priority from German Application Serial No. 10 2006 026 599.8 filed Jun. 8, 2006.

FIELD OF THE INVENTION

The invention pertains to a method for operating an automatic transmission.

BACKGROUND OF THE INVENTION

Vehicles require a transmission to convert rotational forces as well as rotational speeds. The purpose of a vehicle transmission is to transfer the tractive force of a drive unit. The present invention pertains to a method for operating an automatic transmission. In terms of the present invention, all transmissions with automatic gear changers will be addressed under the term automatic transmission and are also described as phase automatic transmissions.

A method is known from DE 100 35 479 A1 for operating an automatic transmission in which shifts are realized in an interlaced manner for the purpose of improving the shift speed of successive upshifts and/or successive downshifts. For this purpose, during each first upshift and/or downshift, a shift element needed for the successive second upshift and/or downshift is prepared during the ongoing first upshift and/or downshift in such a manner that upon realization of a synchronous speed of the ongoing first upshift and/or downshift, the immediate completion of the successive upshift and/or downshift is possible.

Moreover, according to DE 100 35 479 A1, only single shifts are overlapped with each other, which means that each completed first upshift and/or downshift, as well as each successive second upshift and/or downshift, is a single shift between two immediately successive gears.

Especially when the number of gears in automatic transmissions increase and the gear ratio phases between the immediately successive gears decrease, the preparation of shift elements for a second upshift and/or downshift during the first upshift and/or downshift in the sense of overlapped single shifts causes difficulties since the time needed for the preparation of the shift elements for the second upshift and/or downshift during the first upshift and/or downshift is then no longer available.

Proceeding from this, the present invention is based on the problem of creating a new method for operating an automatic transmission. According to the present invention, depending on a gear change, which is to be completed from an actual gear into a nominal gear as first upshift and/or downshift, a multiple shift is preferred over a single shift.

SUMMARY OF THE INVENTION

Within the meaning of the present invention, it is proposed, at least in the first upshift and/or downshift of overlapped upshifts and/or downshifts rather to install multiple shifts instead of a single shift. Due to the utilization of a multiple shift as the first upshift and/or downshift, the gear ratio jump increases for the first upshift and/or downshift so that more time will be available for the preparation of the successive second upshift and/or downshift. During the first upshift and/or downshift, no negative delay procedures, affecting the shift speed and/or shift spontaneity for shift elements, which are disengaging, must be implemented. This improves the shift speed as well as the shift spontaneity of upshifts and/or downshifts which are to be executed successively in an overlapped manner.

Following a first advantageous further development of the invention, when a gear change is to be performed between two non-immediately successive gears, a multiple shift is then always designed as first upshift and/or downshift whereas a single shift is prepared as a successive second upshift and/or downshift during the ongoing first upshift and/or downshift.

Following a second advantageous development of the invention, when a gear change between two non-immediately successive gears is to be performed, a multiple shift is then always designed as a first upshift and/or downshift, whereas a multiple shift is prepared as a successive second upshift and/or downshift during the ongoing first upshift and/or downshift.

Only when a gear change, between two immediately successive gears is to be performed, is a single shift performed as first upshift and/or downshift.

BRIEF DESCRIPTION OF THE DRAWINGS

The invention will now be described, by way of example, with reference to the accompanying drawings in which.

DETAILED DESCRIPTION OF THE INVENTION

Figures 1, 2:
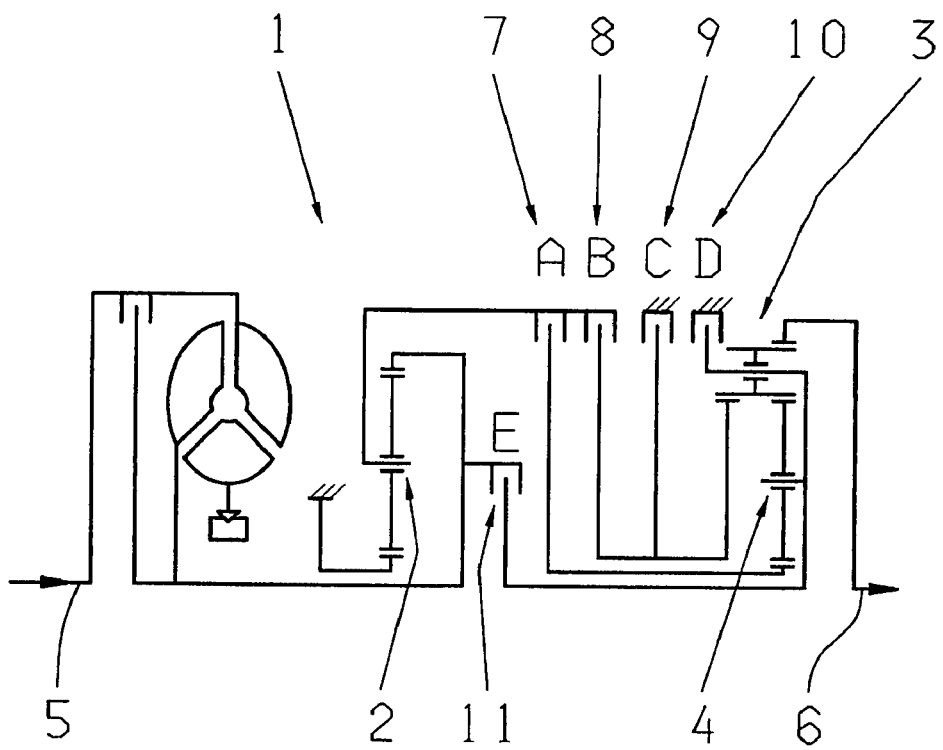
FIG. 1 is a first transmission layout of an automatic transmission with five shift elements, in which the method according to the invention is beneficially applicable.
FIG. 2 is a shift element matrix for the shift elements of the transmission layout of FIG. 1 for the purpose of clarifying which shift elements are closed in which gear.

FIG. 1 shows a first transmission layout 1 of a phase automatic transmission in which the method, according to the present invention, for operating an automatic transmission may be applied. The automatic transmission, shown in FIG. 1, therefore, uses several transmission gearsets 2, 3 and 4 in order to convert a transmission input torque applied to a transmission input 5 into a transmission output torque of a transmission output 6. The transmission gearsets 2, 3, 4 of the automatic transmission are, therefore, according to FIG. 1, designed as planetary transmission gears. According to the transmission layout 1 of FIG. 1, the automatic transmission, in addition to the transmission gearsets 2 through 4, also has a total of five shift elements 7, 8, 9, 10 and 11, whereas the shift element 7 is also referred to as shift element A; shift element 8 as shift element B; shift element 9 as shift element C; shift element 10 as shift element D, and shift element 11 as shift element E. The shift element C and the shift element D are brakes, where the shift elements A, B and E are clutches.

For the automatic transmission, schematically represented in FIG. 1, which includes the five shift elements 7 through 11, applying a shift matrix 12, illustrated in FIG. 2, six forward gears, as well as one reverse gear, can be realized. In the left-hand column of the shift matrix 12, the six forward gears "1" through "6", as well as the reverse gear "R" and, in the upper line of the shift matrix 12, the shift elements A through E are listed. Shift elements, which in the shift element matrix 12, are marked with a dot, are engaged in the respective gear.

In each forward gear, as well as in the reverse gear, two of the five shift elements are engaged in each case. For the forward gear "1," for example, the shift elements A and D, as well as for the reverse gear "R", the shift elements B and D are engaged, respectively. The other shift elements are, therefore, completely disengaged in the respective gear. For the transmission of power and/or rotational torque from transmission input 5 to the transmission output 6, two shift elements are, therefore, completely engaged in each gear in the automatic transmission, illustrated in the Figure, while three shift elements are completely disengaged.

According to the present invention, successive upshifts and/or successive downshifts are performed in an overlapped manner to improve the shift speed, specifically in such a way that in a first upshift and/or downshift at least one shift element needed for a successive second upshift and/or downshift during the ongoing first upshift and/or downshift is prepared, such that upon attaining a synchronous point, preferably a synchronous rotation speed of the ongoing first upshift and/or downshift, the immediate processing of the successive second upshift and/or downshift is possible.

Moreover, according to the invention, depending upon a gear change to be completed from a current gear to a desired gear as first upshift and/or downshift, a multiple shift is preferred to be performed over a single shift. Only when a gear change, between two immediately adjacent gears is to be completed, is a single shift performed as first upshift and/or downshift whereas, during the ongoing first upshift and/or downshift, when another upshift and/or downshift is possible in the same shift direction, a single shift is also prepared as a successive second upshift and/or downshift.

On the other hand, when a gear change between two non-immediately successive gears is to be performed, a multiple shift is always performed as first upshift and/or downshift whereby, during the running first upshift and/or downshift, executed as a multiple shift, either a single shift or also a multiple shift is prepared as a successive second upshift and/or downshift.

The following Table 1 illustrates an exemplary configuration of the method for the automatic transmission of FIGS. 1 and 2. According the following Table 1, successive upshifts, as well as downshift, are implemented in an overlapped manner.

TABLE 1

| | SHIFT ELEMENTS OF AUTOMATIC TRANSMISSION OF FIG. 1, 2 | | | | |
|---|---|---|---|---|---|
| | A | B | C | D | E |
| DOWNSHIFT | | | | | |
| 6-5 (5-4) | pe | e/pd | d | — | x |
| 5-4 (4-3) | e | d/pe | — | — | pd |
| 4-3 (3-2) | x | e/pd | pe | — | d |
| 3-2 (2-1) | x | d | e/pd | pe | — |
| 2-1 | x | — | d | e | — |
| 6-4 (4-3) | e | pe | d | — | pd |
| 5-3 (3-2) | e | pd | pe | — | d |
| 4-2 (2-1) | x | — | e/pd | pe | d |
| UPSHIFT | | | | | |
| 1-2 (2-3) | x | pe | e/pd | d | — |
| 2-3 (3-4) | x | e/pd | d | — | pe |
| 3-4 (4-5) | pd | d/pe | — | — | e |
| 4-5 (5-6) | d | e/pd | pe | — | x |
| 5-6 | — | d | e | — | x | in the above Table 1, successive overlapped upshifts and successive downshifts are listed in parenthesis in the left-hand column. These follow the first upshift and/or downshift. The upshift and/or downshift, not listed in parenthesis, is the first upshift and/or downshift and the upshift and/or downshift, listed in parenthesis, is the second upshift and/or downshift for which one shift element is prepared during the ongoing first upshift and/or downshift.

According to Table 1, first downshifts are either designed as single downshifts or as multiple downshifts, i.e., as double downshifts. Successive second downshifts are always prepared as single downshifts. First upshifts are, however, always designed as single upshifts, to be prepared the same as second upshifts. According to the present invention, depending on a gear change to be performed, in the above table, multiple shifts are preferably implemented from an actual gear to a nominal gear versus single shifts as first downshifts. According to the above Table, after the first downshift, implemented as a multiple downshift, the successive second downshift is implemented as a single downshift. Only when a downshift is to be performed between immediately successive gears, a single shift is performed as first downshift while, instead of a second downshift, a single downshift is also prepared.

For example, if the transmission control selects to change gears, namely a downshift from the forward gear "6" to the forward gear "5" then, while applying the above Table, a single downshift from forward gear "6" to the forward gear "5" is performed as first downshift, during which a single downshift from forward gear "5" to the forward gear "4" is prepared as second downshift. This second downshift, however, is only performed when the transmission control recognizes, depending on the driver's wish, that this is in fact desired. If not, the second downshift, prepared during the first downshift, is terminated.

When the transmission control unit specifies performing a gear change, namely, a downshift from forward gear "6" to forward gear "4", according to the invention, the first downshift is performed as a multiple shift, specifically from forward gear "6" to the forward gear "4" whereby, during the first downshift, a second downshift is prepared as a single downshift from forward gear "4" to the forward gear "3" and is only performed if this is in fact the driver's wish.

For example, if the transmission control selects to change gears, such as a downshift from the forward gear "5" to the forward gear "2" then, while applying the above Table, a multiple downshift is performed as the first downshift, specifically from forward gear "5" to the forward gear "3" while, during this first downshift, a second downshift is prepared as the single downshift from forward gear "3" to the forward gear "2" and will be performed immediately upon attaining the synchronous speed of the first downshift.

In the above Table, shift elements which, during an upshift and/or downshift to be performed, and which are additionally activated on and therefore engaged, are marked with "e". Shift elements that, in turn, are deactivated during a first upshift and/or downshift and therefore disengaged, are marked with "d". Shift elements that, during a first upshift and/or downshift for a successive second upshift and/or downshift, are prepared to be activated and therefore engaged, or to be deactivated and therefore disengaged, are marked in the above table with "pe" or "pd". In the above Table, when shift elements are marked with "e/pd" and/or "d/pe", this means that the respective shift elements are involved in the first upshift and/or downshift, as well as in the successive second upshift and/or downshift. During the transition from the first upshift and/or downshift to the second upshift, the specific shift elements are selected from a minimum or a maximum amount of shift elements. Shift elements marked with "x" are and will remain, in turn, engaged during a shift performance. Shift elements marked with "–" are and will remain disengaged during the shift.

Figures 3, 4:
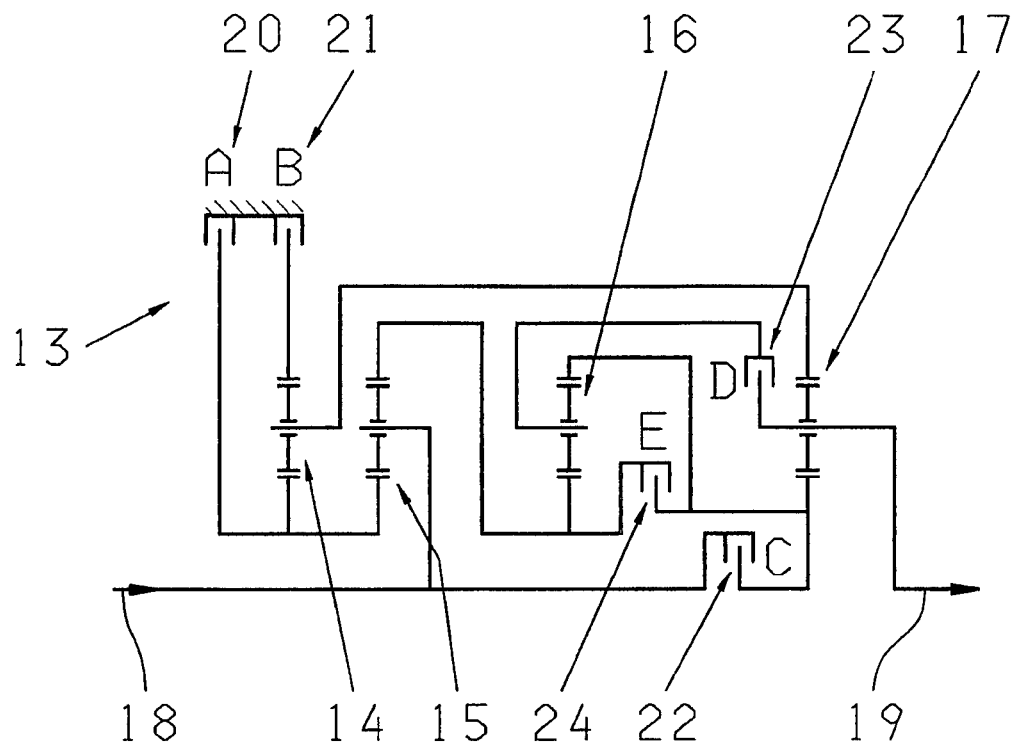
FIG. 3 is a second transmission layout of an automatic transmission with five shift elements, in which the method according to the invention is beneficially applicable.
FIG. 4 is a shift element matrix for the shift elements of the transmission layout of FIG. 3 for the purpose of clarification, to show which shift elements are closed in which gear.

FIG. 3 illustrates a second transmission layout 13 of a phase automatic transmission in which the method of the invention for the operation of an automatic transmission can be applied. The automatic transmission of FIG. 3 has a total of four transmission gearsets 14, 15, 16 and 17, in order to convert transmission input torque applied to a transmission input 18 into a transmission output torque of a transmission output 19. The transmission gearsets 14 through 17 of the automatic transmission, according to FIG. 3 thereby, in turn, are designed as planetary gears. According to the transmission layout 13 of FIG. 3, the automatic transmission has, in addition to the four transmission gearsets 14 through 17, a total of five shift elements 20, 21, 22, 23 and 24, whereby the shift element 20 is also referred to as shift element A; shift element 21 as shift element B; shift element 22 as shift element C; shift element 23 as shift element D, and shift element 24 as shift element E. The shift element A, as well as shift element B, are brakes, while the shift elements C, D and E are clutches.

In FIG. 3 illustrated as a schematic automatic transmission, which includes the five shift elements 20 through 24, applying a shift matrix 25, illustrated in FIG. 4, eight forward gears, as well as one reverse gear, can be realized and are listed in the left-hand column of the shift matrix 25 as the eight forward gears "1" through "8", as well as the reverse gear "R". In the upper line of the shift matrix 25, the shift elements A through E are listed. Shift elements which, in the shift element matrix 25 are marked with a dot, are engaged in the respective gear.

In each forward gear, as well in the reverse gear, three of the five shift elements are engaged in any given case. For the forward gear "1", for example, the shift elements A, B and C, as well as for the reverse gear "R", the shift elements A, B and D are therefore engaged. The other shift elements are, therefore, completely disengaged in the respective gear. For the transmission of power and/or rotational torque from transmission input 18 to the transmission output 19, three shift elements are completely engaged in each gear in the automatic transmission, illustrated in FIG. 3, while two shift elements are completely disengaged.

Additionally, in connection with the automatic transmission according to FIGS. 3 and 4, successive upshifts and/or successive downshifts are to be overlapped, specifically in such a manner that, during the process of the first upshift and/or downshift, at least one shift element, necessary for a successive second shift, is prepared.

In this connection, Table 2 shows a possible implementation of the method, according to the invention, for the automatic transmission of FIGS. 3 and 4 whereby, the same nomenclature of Table 1 with regard to the automatic transmission of FIGS. 1 and 2, applies to these Tables.

TABLE 2

| | SHIFT ELEMENTS OF AUTOMATIC TRANSMISSION OF FIGS. 3, 4 | | | | |
|---|---|---|---|---|---|
| | A | B | C | D | E |
| DOWNSHIFT | | | | | |
| 8-7 (7-6) | pd | — | e | x | d/pe |
| 7-6 (6-5) | d | pe | — | x | e/pd |
| 6-5 (5-4) | — | e | pd | x | d/pe |
| 5-4 (4-3) | — | x | d/pe | pd | e |
| 4-3 (3-2) | pe | x | e/pd | d | — |
| 3-2 (2-1) | e | x | d/pe | — | pd |
| 2-1 | x | x | e | — | d |
| 8-6 (6-5) | d | pe | e | x | pd |

TABLE 2-continued

| | SHIFT ELEMENTS OF AUTOMATIC TRANSMISSION OF FIGS. 3, 4 | | | | |
|---|---|---|---|---|---|
| | A | B | C | D | E |
| 7-5 (5-4) | d | e | pd | x | pe |
| 6-4 (4-3) | — | e | d/pe | pd | x |
| 5-3 (3-2) | pe | x | pd | d | e |
| 4-2 (2-1) | e | x | pe | d | pd |
| 3-1 | e | x | x | — | d |
| 8-4 (4-3) | d | e | pe | pd | x |
| 8-2 (2-1) | x | e | pe | d | pd |
| 7-1 | x | e | x | d | — |
| 6-3 (3-2) | pe | e | pd | d | x |
| 5-1 | e | x | x | d | — |
| UPSHIFT | | | | | |
| 1-2 (2-3) | pd | x | d/pe | — | e |
| 2-3 (3-4) | d | x | e/pd | pe | x |
| 3-4 (4-5) | — | x | d/pe | e | pd |
| 4-5 (5-6) | — | pd | e | x | d/pe |
| 5-6 (6-7) | pe | d | x | x | e/pd |
| 6-7 (7-8) | e | — | pd | x | d/pe |
| 7-8 | x | — | d | x | e |
| 1-3 (3-4) | d | x | pd | pe | e |
| 2-4 (4-5) | d | x | pe | e | pd |
| 3-5 (5-6) | — | pd | x | e | d/pe |
| 4-6 (6-7) | pe | d | e | x | pd |
| 5-7 (7-8) | e | d | pd | x | pe |
| 6-8 | e | — | d | x | x |

When applying Table 2 for the automatic transmission of FIGS. 3 and 4, depending on the gear change to be performed from a current gear to a desired gear, first upshifts and first downshifts are preferably multiple shifts as opposed to single shifts. During the performance of such a multiple shift, the second successive upshift and/or downshift is prepared as a single shift. Downshifts performed as multiple shifts can be double downshifts, triple downshifts and quadruple downshifts, as well as sextuple downshifts. During upshifts, double shifts are performed as first shifts as multiple shifts according to Table 2.

Likewise, it is possible for the automatic transmission of FIGS. 3 and 4, as shown in Table 3 below, to perform a multiple shift in the overlapped implementation of successive upshifts and/or successive downshifts as the first upshift and/or downshift or to perform, for example, a double shift and/or multiple shift while, for a second successive upshift and/or downshift, a multiple shift, specifically a double shift, is prepared. The nomenclature described in connection with Table 1 applies to Table 3 as well.

TABLE 3

| | SHIFT ELEMENTS OF AUTOMATIC TRANSMISSION OF FIGS. 3, 4 | | | | |
|---|---|---|---|---|---|
| | A | B | C | D | E |
| DOWNSHIFT | | | | | |
| 8-6 (6-4) | d | pe | e/pd | x | x |
| 7-5 (5-3) | d | e | e | pd | pe |
| 6-4 (4-2) | pe | e | d | pd | x |
| 5-3 (3-1) | pe | x | x | d | e/pd |
| 8-4 (4-2) | d/pe | e | — | pd | x |
| UPSHIFT | | | | | |
| 4-6 (6-8) | pe | d | e/pd | x | x |

Within the meaning of the method of the invention for operating an automatic transmission with overlapped implementation of successive upshifts and/or successive downshifts, multiple shifts are preferable as first upshifts and/or downshifts, over single shifts. During the performance of such multiple shifts, either a multiple shift or a single shift is prepared for the possible successive upshift and/or downshift as the second upshift and/or downshift. Only when a gear change, between two immediately successive gears is to be performed the first upshift and/or downshift, is a single shift, while a single shift is prepared as a second successive shift. It depends on the driver's wish as to whether a prepared second upshift and/or downshift is, in fact, performed. If a prepared second upshift and/or downshift does not meet with the driver's wish, it is then terminated. The selection of the shift elements to be prepared for a second upshift and/or downshift during a performed first upshift and/or downshift takes place through an assignment matrix, according to the Tables 1 through 3.

REFERENCE NUMERALS 1 transmission schema
2 transmission gears
3 transmission gears
4 transmission gears
5 transmission input
6 transmission output
7 shift element A
8 shift element B
9 shift element C
10 shift element D
11 shift element E
12 shift element matrix
13 transmission schema
14 transmission gears
15 transmission gears
16 transmission gears
17 transmission gears
18 transmission input
19 transmission output
20 shift element A
21 shift element B
22 shift element C
23 shift element D
24 shift element E
25 shift element matrix

The invention claimed is:

1. A method of operating an multispeed automatic transmission of a motor vehicle for at least one of torque transmission and power transmission in which the automatic transmission has a plurality of shifting elements, and for each of a plurality of forward gears and for reverse gear, a first number of the plurality of shifting elements are engaged and a second number of the plurality of shifting elements are disengaged, and at least one of a successive upshift and a successive downshift, for improvement of a shift speed, are implemented in an overlapped manner such that during one of a first upshift and a first downshift, preparing at least one shifting element, necessary for a successive second upshift and a successive second downshift, during the first upshift or the first downshift in such manner that, upon attaining a synchronous point of the first upshift or the first downshift, the successive upshift or the successive downshift is capable of being preformed immediately and, depending on a desired gear change, a multiple shift is implemented as the first upshift or the first downshift from a current gear to a desired gear, and executing a single shift as the first upshift or the first downshift only when a gear change between two immediately successive desired gears is to be implemented.

2. The method according to claim 1, further comprising the step of preparing the successive upshift or the successive downshift as a single shift, during the first upshift or the first downshift, when the first upshift or the first downshift is a single shift.

3. A method of operating an multispeed automatic transmission of a motor vehicle for at least one of torque transmission and power transmission in which the automatic transmission has a plurality of shifting elements, and for each of a plurality of forward gears and for reverse gear, a first number of the plurality of shifting elements are engaged and a second number of the plurality of shifting elements are disengaged, and at least one of a successive upshift and a successive downshift, for improvement of a shift speed, are implemented in an overlapped manner such that during one of a first upshift and a first downshift, preparing at least one shifting element, necessary for a successive second upshift and a successive second downshift, during the first upshift or the first downshift in such manner that, upon attaining a synchronous point of the first upshift or the first downshift, the successive upshift or the successive downshift is capable of being preformed immediately, depending on a desired gear change, and a multiple shift is implemented as the first upshift or the first downshift from a current gear to a desired gear, and
  always performing the first upshift or the first downshift as the multiple shift, when the desired gear change is between two not immediately successive gears.

4. The method according to claim 3, further comprising the step of preparing the successive upshift or the successive downshift as a single shift when the first upshift or the first downshift is performed as a multiple shift.

5. The method according to claim 3, further comprising the step of preparing the successive upshift or the successive downshift as a multiple shift, during the first upshift or the first downshift, when the first upshift or the first downshift is performed as a multiple shift.

6. A method of operating a multispeed automatic transmission of a motor vehicle in which the automatic transmission comprises a plurality of shifting elements and a first number of the plurality of shifting elements are engaged and a second number of the plurality of shifting elements are disengaged for each of a plurality of forward gears and for a reverse gear, and the method comprising the steps of:
  for a gear change between a current gear and a desired gear in which the current and the desired gears are non-immediately successive gears,
    performing at least one of a first upshift and a first downshift to at least one successive gear of the transmission arranged successively between the current gear and the desired gear, and
    during the at least one of the first upshift and the first downshift,
      preparing at least one shifting element necessary for at least one of a second upshift and a second downshift necessary for a shift to the desired gear, and
    upon attaining a synchronous point of the at least one of the first upshift and the first downshift,
      performing the at least one second upshift and the second downshift to the desired gear so that a gear change between the current gear and the desired gear is performed as a multiple gear shift operation.

7. The method according to claim 6, further comprising the step of employing five shifting elements within the automatic transmission, and transmitting the at least one of the torque and the power in each of the plurality of forward gears and in reverse gear with two engaged shifting elements and three disengaged shifting elements.

8. The method according to claim 6, further comprising the step of employing five shifting elements within the automatic transmission, and transmitting the at least one of the torque and the power in each of the plurality of the forward gears and in the reverse gear by engagement of at least three shifting elements.

9. The method according to claim 6, further comprising the step of employing five shifting elements within the automatic transmission, and transmitting the at least one of the torque and the power in each of the plurality of forward gears and in the reverse gear with disengagement of a maximum of two shifting elements.

10. The method according to claim 6, further comprising the step of employing five shifting elements within the automatic transmission, and transmitting the at least one of the torque and the power in each of the plurality of forward gears and in the reverse gear with engagement of three of the five shifting elements and disengagement of two of the five shifting elements.

* * * * *